United States Patent
Cope et al.

(10) Patent No.: US 7,916,716 B1
(45) Date of Patent: Mar. 29, 2011

(54) SYSTEM AND METHOD FOR PROVIDING LOCAL SERVICES WITHIN A CONSOLIDATED NETWORK ARCHITECTURE

(75) Inventors: Warren B. Cope, Olathe, KS (US); Arun Santharam, Overland Park, KS (US); David A. Welch, Shawnee, KS (US); Farni B. Weaver, Spring Hill, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1881 days.

(21) Appl. No.: 10/979,988

(22) Filed: Nov. 3, 2004

(51) Int. Cl.
*H04L 12/66* (2006.01)

(52) U.S. Cl. .......................... 370/352; 370/401; 379/45

(58) Field of Classification Search ................. 370/352, 370/401, 353, 392; 379/114, 45
See application file for complete search history.

(56) References Cited

U.S. PATENT DOCUMENTS

| | | | |
|---|---|---|---|
| 6,292,542 B1* | 9/2001 | Bilder | 379/45 |
| 6,470,008 B1* | 10/2002 | Khuc | 370/352 |
| 2002/0167936 A1* | 11/2002 | Goodman | 370/352 |
| 2004/0042414 A1* | 3/2004 | Bouret et al. | 370/252 |
| 2006/0072547 A1* | 4/2006 | Florkey et al. | 370/352 |

* cited by examiner

*Primary Examiner* — Simon King

(57) ABSTRACT

A system and method for a next generation network service infrastructure to support VoIP services is disclosed. The services are partitioned between locally based services and nationally based services. Locally based services are handled in call processing systems in regional/local service centers based at the edge of the system. Nationally based services are handled by national service centers.

12 Claims, 4 Drawing Sheets

SYSTEM AND METHOD FOR PROVIDING LOCAL SERVICES WITHIN A CONSOLIDATED NETWORK ARCHITECTURE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

The prevalence of Internet Protocol (IP) networks, also called packet based networks, is increasing. Many of these IP networks allow new and innovative services including voice over internet protocol (VoIP). Unfortunately the current architecture may not meet the needs of a nationally deployed IP network that supports the range of features available.

Therefore there is a need for a next generation network service infrastructure to support these types of services.

SUMMARY OF THE INVENTION

A system and method for a next generation network service infrastructure to support packet based services is disclosed. The services are partitioned between locally based services and nationally based services. Locally based services are handled in call processing systems in regional/local service centers based at the edge of the system. Nationally based services are handled by national service centers.

DETAILED DESCRIPTION OF THE PREFERRED EMBODIMENT

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
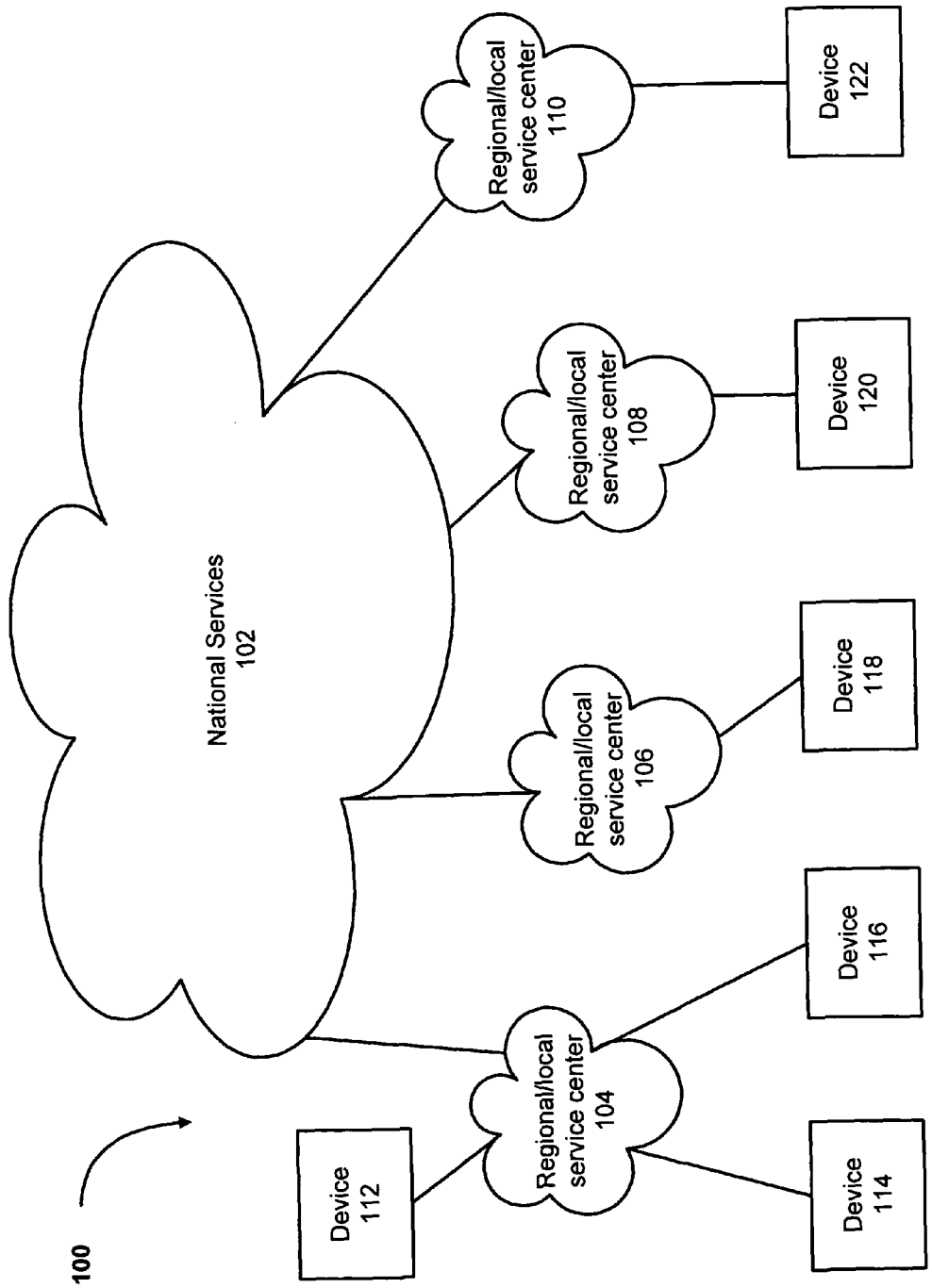
FIG. 1 illustrates a network architecture in an example embodiment of the invention.

Network Architecture—FIG. 1

FIG. 1 illustrates network architecture 100 in an example embodiment of the invention. Network architecture 100 includes national services 102 connected to regional/local service centers 104, 106, 108, and 110. Devices 112, 114, and 116 are connected to regional/local service center 104. Device 118 is connected to regional/local service center 106. Device 120 is connected to regional/local service center 108. Device 122 is connected to regional/local service center 110. Devices 112, 114, 116, 118, 120, and 122 can be any type of device including a phone, a computer, a network, or the like. The devices may be connected to the regional/local service centers using a number of different connection technologies including various types of transmission media, for example optical, wireless, wire, microwave or the like, and various types of protocols, for example packet based, TDM, CDMA, or the like. When a device requests a local service, the regional/local service center fulfills the request. Some examples of local services may include: one click dialing, custom announcements, personal call controls, local call connections, voice mail, and the like. For example, when the user of device 112 wishes to check their voice mail, device 112 will connect to regional/local service center 104 and regional/local service center 104 will provide the voice mail service to device 112. Other types of service may be nationally based. For example, the ability for call forwarding may be nationally based. When the user of device 112 wishes to forward calls directed to device 112, device 112 will send the request to regional/local service center 104. The national services 102 will fulfill the requested service. Partitioning the services into local services and nationally based services allows services that are widely used to be distributed throughout the network which restricts the traffic for local services to the local areas. In one embodiment of the current invention there would be 29 regional/local service centers. In this application national means a country, for example the US and local/regional means a subset of national area, for example a state or the area serviced by an area code.

There are a number of ways that the regional/local service center can determine if the requested service is a regional service or a nationally based service. The regional/local service center may determine if it is a local service by using a lookup table. The lookup table may contain a list of local services or may contain a list of national services. The regional/local service center may compare the requested service to the list of services in the lookup table to determine if the requested service is local or national. The regional/local service center may determine if it is a local service by using the application ID. When an application requests a service, the application typically provides an application ID in the service request. Some applications may always request a local service and some applications may always request a nationally based service. Using the application ID the local/regional service center may be able to determine the type of service from the application ID.

Figure 2:
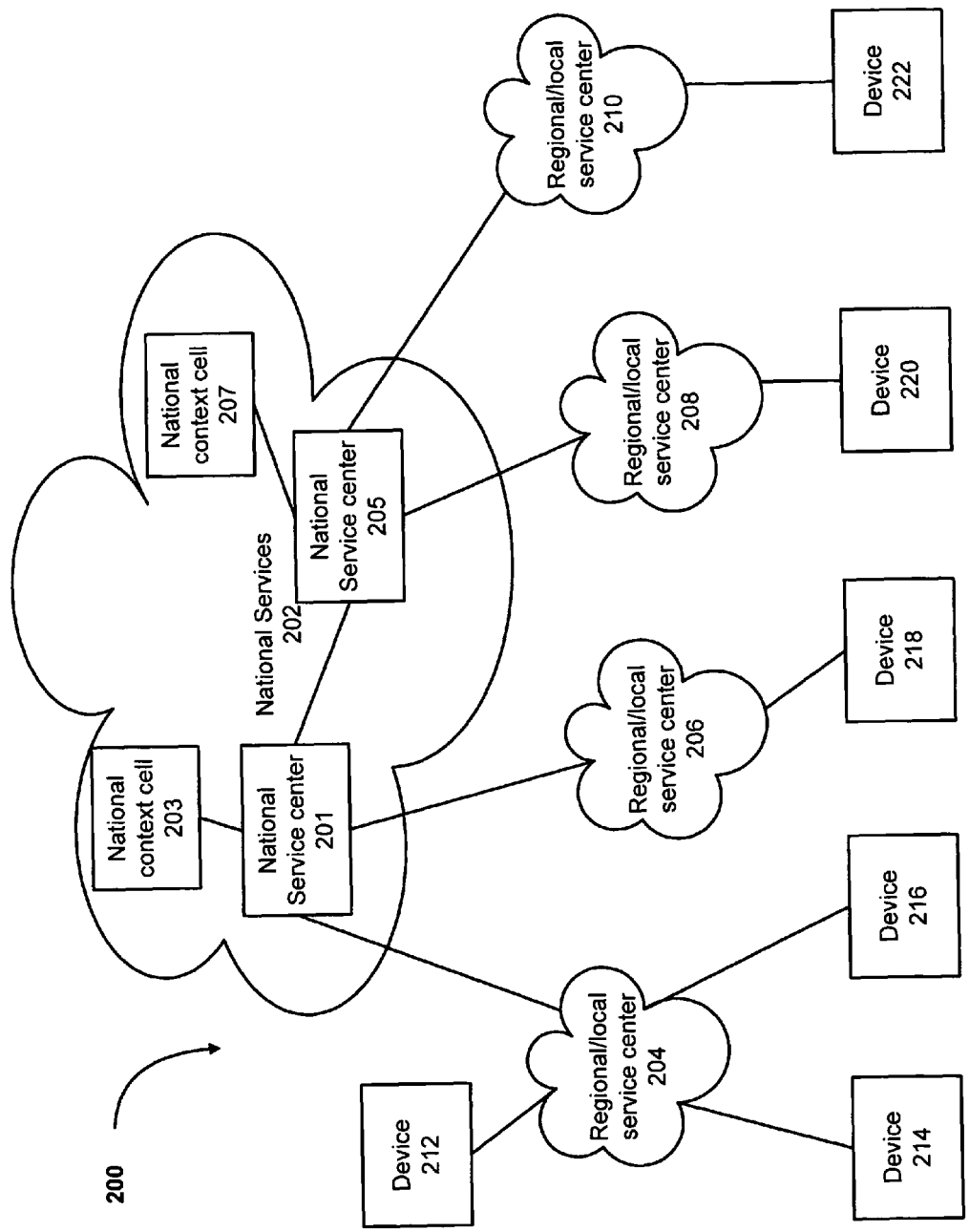
FIG. 2 illustrates an expanded view of a network architecture in an example embodiment of the invention.

FIG. 2 is an expanded view of the nationally based service architecture in an example embodiment of the current invention. In FIG. 2 the national services are depicted as two national service centers 201 and 205. In FIG. 2 national service center 201 is connected to national context cell 203. National service center 205 is connected to national context cell 207. In one embodiment of the current invention there would be 6 national service centers and 4 national context cells. The national context cells 203 and 207 provide context for the services requested. For example, the context centers may contain the user profiles, number translations, user authentication, user authorization, and the like. Multiple regional service centers may be connected to one national service center. In FIG. 2, regional service centers 204 and 206 are connected to national service center 201. Regional service centers 208 and 210 are connected to national service center 205. When a device requests a nationally based service, the regional/local service center will connect to a national service center and the national service center will fulfill the requested service. For example, when device 214 requests a national service from regional/local service center 204, regional/local service center 204 will pass the request for the national service to national service center 201. National service center 201 may request context for the service from national context cell 203. For example national service center may request the user profile for device 214 to determine if device 214 is authorized for the requested service. Once the national service center has determined that device 214 is authorized for the requested service the national service center 201 will fulfill the request.

Every nationally based service may not be supported at each national service center. For example, the nationally based service requested by device 214 may not be supported by national service center 201, it may only be supported at national service center 205. When a national service center receives a request for a nationally based service, the national service center determines if it can fulfill the request. When the national service center supports the requested service, the national service center fulfills the request. When a national service center does not support the requested service, the national service center queries a national context center to determine which national service center does support the requested service. Once the national service center determines which national service center supports the requested service, the national service center forwards the request to the national service center that does support the requested service. For example, when device 214 requests a nationally based service that is not supported by national service center 201, then national service center 201 will query national context cell 203 to determine which national service center supports the requested service. National context cell 203 may respond that national service center 205 supports the requested service. National service center 201 will forward the request for service to national service center 205. National service center 205 will fulfill the request.

In one example embodiment, the normal flow for determining which national service center supports a requested service is for every national service center to send a query to a national context cell, even when the national service center that sent the query is the national service center that supports the service.

Figure 3:
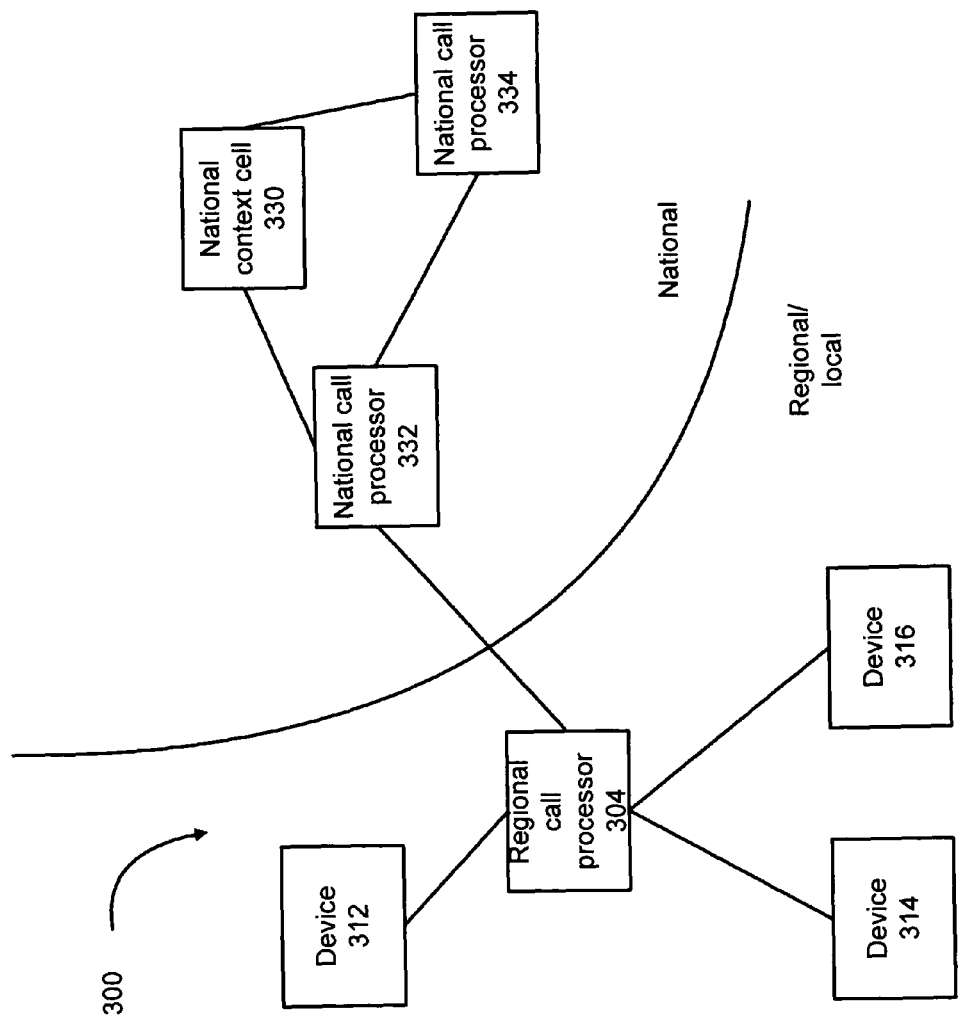
FIG. 3 is a device level view of a network architecture in an example embodiment of the invention.

Device Level View—FIG. 3

FIG. 3 illustrates a device level view of architecture 300 in an example embodiment of the invention. Various features of architecture 300 could be incorporated in architecture 100 of FIG. 1. FIG. 3 shows regional call processor (RCP) 304 connected to devices 312, 314, and 316. Regional call processor (RCP) may comprise a media gateway controller, a softswitch, routers, a class 5 switch, a class 4/5/SWAT, or the like. Devices 312, 314, and 316 can be any type of device including a phone, a computer, a network, or the like. The devices may be connected to the regional call processor (RCP) 304 using a number of different connection technologies including various types of transmission media, for example optical, wireless, wire, microwave or the like, and various types of protocols, for example packet based, TDM, CDMA, or the like. When device 312 requests a local service, the regional call processor (RCP) 304 fulfills the request. For example, when device 312 requests a connection to device 316, regional call processor (RCP) 304 establishes the path for the connection. When device 312 requests a service that is nationally based, regional call processor (RCP) 304 determines that the request is for a nationally based service. Regional call processor 304 passes the request to national call processor 332. Regional call processor 304 may use a session initiation protocol (SIP) enhanced message to pass the request on to the national call processor 332. The SIP message may contain the dialed number, the destination number, a user ID, and the requested service. The user ID may be the IP address of the device. The national call processor 332 may query the national context cell 330 to get the context for the requested service. National call processor 332 will fulfill the request.

Every nationally based service may not be supported at each national call processor. For example, the nationally based service requested by device 314 may not be supported by national call processor 332, it may only be supported at national call processor 334. When a national call processor receives a request for a nationally based service, the national call processor determines if it can fulfill the request. When the national call processor supports the requested service, the national call processor fulfills the request. When a national call processor does not support the requested service, the national call processor queries a national context center to determine which national call processor does support the requested service. Once the national call processor determines which national call processor supports the requested service, the national call processor forwards the request to the national call processor that does support the requested service. For example, when device 314 requests a nationally based service that is not supported by national call processor 332, then national call processor 332 will query national context cell 330 to determine which national call processor supports the requested service. National context cell 330 may respond that national call processor 334 supports the requested service. National call processor 332 will forward the request for service to national call processor 334. National call processor 334 will fulfill the request.

In one example embodiment, the normal flow for determining which national call processor supports a requested service is for every national call processor to send a query to a national context cell, even when the national call processor that sent the query is the national call processor that supports the service.

Each device or end point may need to register to gain access to the services provided. In one embodiment of the current invention, each end point or device would register with the local regional call processor (RCP) at power up. The RCP and the end points may both support SIP Digest Authentication or the like. When the device or end point only registers for locally based services, then the registration at the RCP is all that is required. When the device is subscribing for nationally based services, then a national registration process is followed.

Figure 4:
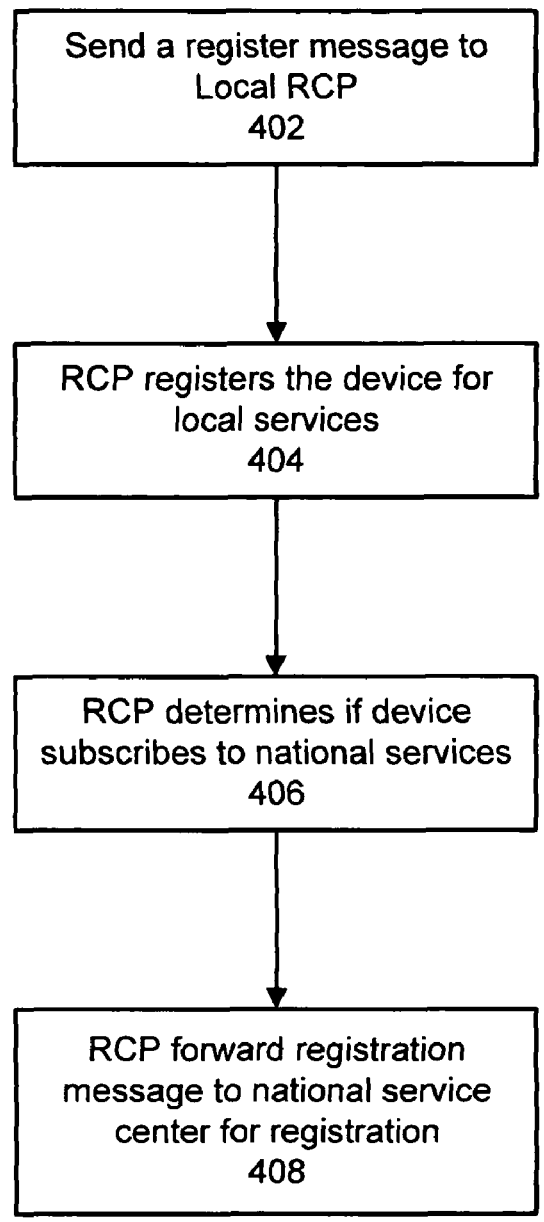
FIG. 4 is a flow chart for national registration in an example embodiment of the invention.

FIG. 4 is a flow chart for a national registration process in one example embodiment of the current invention. At power up a device sends a register message to the local regional call processor (RCP) (402). The register message may contain the user ID and the IP address for the device. The RCP registers the device for local services (404). The RCP queries a national service center (406) to determine if the device has subscribed to any nationally based services. When the device is subscribing to a nationally based service, then the RCP forwards the register message to a national service center (408) where the national service center registers the device.

In another example embodiment of the invention, the register message may contain a list of subscribed services. The local RCP would register the device for any local services requested. The local RCP would determine if any of the requested services where nationally based. When a nationally based service is requested the RCP would forward the register message to a national service center where the national service center would register the device. In one embodiment, the RCP may determine the nationally based services using a lookup table. In another embodiment, the nationally based services may be marked by a flag. The local RCP would detect the flag designating a service as nationally based, and forward the registration message to a national service center.

We claim:

1. A method of providing services within a network, the method comprising:
   hosting a set of local voice over internet protocol (VoIP) services in a plurality of local regional call processors (RCP);
   hosting a set of national VoIP services in a plurality of national service centers;
   receiving a service request for a service at a local RCP of the plurality of local RCP, wherein the service request indicates an application identifier associated with the service;
   determining whether the service is one of the national VoIP services or one of the local VoIP services based on the associated application identifier;
   forwarding the service request to a national service center of the plurality of national service centers when the service is one of the national VoIP services;
   transmitting a query from the national service center to a national context center, when the service is one of the national VoIP services, and in response, receiving context information indicating a one national service center of the plurality of national service centers that will fulfill the requested national VoIP service;
   forwarding the service request to the one national service center and fulfilling the service request at the one national service center when the service is one of the national VoIP services and when the national service center is not the one national service center;
   fulfilling the service request at the national service center of the plurality of national service centers if the national service center is the one national service center; and
   fulfilling the service request at the local RCP when the service is one of the local VoIP services.

2. The method of claim 1, wherein the local VoIP services comprise one click dialing, custom announcements, personal call controls, access to Public Safety Answering Point (PSAP), and voice mail.

3. The method of claim 1, wherein determining whether the service is one of the national VoIP services or one of the local VoIP services comprises determining whether the service is one of the national VoIP services using a lookup table containing a list of the set of local VoIP services.

4. The method of claim 1, wherein determining whether the service request is for one of the national VoIP services or one of the local VOIP services comprises determining whether the service is one of the national VoIP services using a table containing a list of application identifiers that correspond to the set of national VoIP services.

5. The method of claim 1, wherein a device registers with local RCP using a register message when the device powers on.

6. The method of claim 5, wherein the local RCP forwards the register message to the national service center when the device registers for one of the national VoIP services.

7. A communication network comprising:
   a regional call processor configured to host a set of local voice over internet protocol (VoIP) services;
   a plurality of national service centers configured to host a set of national VoIP services;
   the regional call processor further configured to receive a service request for a service from a device, wherein the service request indicates an application identifier associated with the service, determine whether the service is for one of the national VoIP services or one of the local VoIP services based on the application identifier, route the service request to a national service center when the service is one of the national VoIP services, and fulfill the service request at the regional call processor when the service request is for one of the local VoIP services; and
   the national service center further configured to transmit a query to a national context center, when the service is one of the national VoIP services, and in response, receive context information indicating a one national service center of the plurality of national service centers that will fulfill the service request, forward the service request to the one national service center to fulfill the service request when the national service center is not the one national service center, and fulfill the service request at the national service center of the plurality of national service centers if the national service center is the one national service center.

8. The communication network of claim 7, wherein the regional call processor determines whether the service is one of the national VoIP services by comparing the requested service to a table of the set of national VoIP services.

9. The communication network of claim 7, wherein the regional call processor determines whether the service is one of the national VoIP services using a table containing a list of application identifiers that correspond to the set of national VoIP services.

10. The communication network of claim 7, wherein the local VoIP services comprise one click dialing, custom announcements, personal call controls, access to Public Safety Answering Point (PSAP), and voice mail.

11. The communication network of claim 7, wherein the device registers with the regional call processor using a register message when the device powers on.

12. The communication network of claim 11, wherein the regional call processor forwards the register message to the national service center when the device registers for one of the national VoIP services.

\* \* \* \* \*